United States Patent
Murphy et al.

(10) Patent No.: US 10,035,598 B2
(45) Date of Patent: Jul. 31, 2018

(54) SYSTEM AND METHOD FOR EXPANDING A LUGGAGE INSPECTION AREA

(71) Applicants: Christopher Murphy, Ann Arbor, MI (US); Robertus A. Schmit, West Bloomfield, MI (US)

(72) Inventors: Christopher Murphy, Ann Arbor, MI (US); Robertus A. Schmit, West Bloomfield, MI (US)

(73) Assignees: JERVIS B. WEBB COMPANY, Farmington Hills, MI (US); DAIFUKU CO., LTD., Osaka (JP)

(*) Notice: Subject to any disclaimer, the term of this patent is extended or adjusted under 35 U.S.C. 154(b) by 0 days.

(21) Appl. No.: 15/289,704

(22) Filed: Oct. 10, 2016

(65) Prior Publication Data
US 2018/0099750 A1 Apr. 12, 2018

(51) Int. Cl.
*B64D 11/00* (2006.01)
*B65G 37/02* (2006.01)
*B64F 1/36* (2017.01)

(52) U.S. Cl.
CPC ............ *B64D 11/00* (2013.01); *B64F 1/368* (2013.01); *B65G 37/02* (2013.01); *B65G 2201/0264* (2013.01)

(58) Field of Classification Search
CPC ........... B65G 2201/0264; B65G 37/02; B64D 11/00; B64F 1/368; B64F 1/366;
(Continued)

(56) References Cited

U.S. PATENT DOCUMENTS

| 5,190,428 A | 3/1993 | Bryant et al. |
| 5,385,243 A | 1/1995 | Jackson et al. |

(Continued)

FOREIGN PATENT DOCUMENTS

| CN | 101031792 A | 9/2007 |
| CN | 103183212 A | 7/2013 |

(Continued)

OTHER PUBLICATIONS

"Planning Guidelines and Design STandards for Checked Baggage Inspection Systems" Transportation Security Administration, Oct. 10, 2007. (Year: 2007).*

*Primary Examiner* — Mark A Deuble
(74) *Attorney, Agent, or Firm* — Dickinson Wright PLLC

(57) ABSTRACT

A system and method for operating a luggage inspection area. The method includes providing an entrance mechanism wherein luggage items are received into the luggage inspection area. A primary inspection mechanism and a primary checked bag reconciliation area are provided that are configured to inspect a predetermined throughput of luggage items. A primary material handling device is provided that extends between the entrance mechanism, the primary inspection mechanism and the primary checked bag reconciliation area. The occurrence of an upcoming peak event is determined, and in response, a supplemental inspection mechanism, a supplemental checked bag reconciliation area and a first supplemental material handling device are provided. The supplemental components provide increased throughput of luggage items inspected during the occurrence of the peak event and are configured to be portable such that they may be quickly and easily be added and removed.

17 Claims, 2 Drawing Sheets

(58) Field of Classification Search
CPC ............ G07C 9/00087; G07C 9/00071; G07C 9/00309; G07C 9/00111; G07C 11/00; G06Q 30/0244; G05B 1/01; G07B 15/00
See application file for complete search history.

(56) References Cited

U.S. PATENT DOCUMENTS

| | | | |
|---|---|---|---|
| 6,349,237 | B1 | 2/2002 | Koren et al. |
| 6,675,946 | B2 | 1/2004 | Lutz |
| 6,937,692 | B2 | 8/2005 | Johnson et al. |
| 7,012,256 | B1 | 3/2006 | Roos et al. |
| 7,270,227 | B2 | 9/2007 | Bender et al. |
| 7,343,995 | B2 | 3/2008 | Fukuhara et al. |
| 7,471,764 | B2 * | 12/2008 | Kaval ............... G01N 23/04 378/57 |
| 7,490,710 | B1 | 2/2009 | Weskamp et al. |
| 7,561,664 | B2 | 7/2009 | Teslyar et al. |
| 7,577,234 | B2 * | 8/2009 | Roe ............... B64F 1/366 378/208 |
| 7,686,154 | B2 | 3/2010 | Henkel et al. |
| 7,815,036 | B2 | 10/2010 | Spangler et al. |
| 8,474,595 | B2 | 7/2013 | Crass et al. |
| 8,561,290 | B2 | 10/2013 | Yamashita et al. |
| 8,678,169 | B2 | 3/2014 | Baker et al. |
| 8,731,137 | B2 | 5/2014 | Arroyo, Jr. et al. |
| 8,899,404 | B2 | 12/2014 | Schoepe et al. |
| 8,939,076 | B2 | 1/2015 | Doyle |
| 9,074,984 | B2 | 7/2015 | Padgett et al. |
| 2003/0128806 | A1 | 7/2003 | Morrell |
| 2007/0029165 | A1 | 2/2007 | Bender et al. |
| 2007/0083414 | A1 | 4/2007 | Krohn |
| 2007/0217571 | A1 | 9/2007 | Teslyar et al. |
| 2007/0280502 | A1 | 12/2007 | Paresi et al. |
| 2009/0284343 | A1 * | 11/2009 | Ambrefe, Jr. ...... G07C 9/00158 340/5.2 |
| 2010/0254511 | A1 | 10/2010 | Panesar et al. |
| 2014/0277698 | A1 | 9/2014 | Combs et al. |
| 2016/0252646 | A1 * | 9/2016 | Sarraiocco ........... G01V 5/0016 382/103 |

FOREIGN PATENT DOCUMENTS

| | | |
|---|---|---|
| CN | 203544989 U | 4/2014 |
| CN | 103183212 B | 4/2015 |
| DE | 1481069 A1 | 10/1969 |
| DE | 102009048770 A1 | 4/2011 |
| WO | 2006015381 A2 | 2/2006 |

* cited by examiner

SYSTEM AND METHOD FOR EXPANDING A LUGGAGE INSPECTION AREA

TECHNICAL FIELD

A system and method for operating a luggage inspection area. More particularly, a system and method for expanding a luggage inspection area during the occurrence of a peak event.

BACKGROUND OF THE INVENTION

In the field of baggage security inspection, such as at airports, checked luggage items typically undergo a first inspection with an inspection mechanism such as an x-ray machine, and based on the first inspection, may undergo a physical inspection by one or more agents. The physical inspection step takes place in a facility known as a Checked Baggage Reconciliation Area (CBRA). The CBRA facility typically includes conveyance equipment for transporting the luggage items from an entrance mechanism to the agents. The CBRA facility also typically includes conveyance equipment for transporting the luggage items from the agents back to a level one inspection system and to a baggage sortation/delivery system from which the luggage items may be delivered to their ultimate destination, e.g., an airplane. The CBRA facility further includes one or more inspection stations where the agents perform the action of inspecting baggage. These stations typically include an inspection table, tools for opening bags, information displays electronically connected to the airport facilities security screening network, and tools to facilitate the agents' inspection procedures.

The inspection area has a throughput capacity defined by the initial inspection system and CBRA. More particularly, the CBRA has a throughput capacity defined by the number of staffed inspection stations and the mean processing time of the agents in those stations. The agents' processing time is fixed, so the capacity of the CBRA is proportional to the number of inspection stations that can be staffed with agents. When the luggage inspection area is initially built, design parameters include a nominal throughput, and the required number of inspection stations to satisfy that throughput. An airport's baggage load fluctuates over the course of time. Conventionally, the nominal throughput is determined by the peak baggage load that the facility is expected to experience during its expected life. As such, the typical nominal throughput of a luggage inspection area is usually lower than the peak. The peak may only occur during a few days in the year due to a sporting event, a convention, or some other rare event. Therefore, following the conventional process for sizing the luggage inspection results in a luggage inspection area that can handle a peak that rarely happens. This is an inefficient investment in equipment and facility space. In view of the foregoing, there remains a need for improvements to luggage inspection systems.

SUMMARY OF THE INVENTION

According to an aspect of the disclosure, a method for operating a luggage inspection area is provided. The method includes providing an entrance mechanism wherein luggage items are received into the luggage inspection area. A primary inspection mechanism is provided which is configured to direct the luggage items to a primary checked bag reconciliation area in response to a determination that the luggage items require further inspection. The primary checked bag reconciliation area includes at least one primary inspection station. The primary inspection mechanism and primary checked bag reconciliation area are configured to inspect a predetermined throughput of luggage items. The method further includes providing a primary material handling device that extends between the entrance mechanism, the primary inspection mechanism and the primary checked bag reconciliation area. The primary material handling device transports the luggage items between the entrance mechanism, the primary inspection mechanism and the primary checked bag reconciliation area. The method also includes determining the occurrence of an upcoming peak event that correlates with a number of luggage items being received into the luggage inspection area by the entrance mechanism being greater than the predetermined throughput of luggage items. In response to the determination of the peak event, the method includes providing a supplemental inspection mechanism, a supplemental checked bag reconciliation area, and a first supplemental material handling device. The supplemental inspection mechanism is configured to direct the luggage items to the supplemental checked bag reconciliation area in response to a determination that the luggage items require further inspection. The supplemental checked bag reconciliation area includes at least one supplemental inspection station, and the first supplemental material handling device extends between the supplemental inspection mechanism and the supplemental checked bag reconciliation area for transporting the luggage items between the supplemental inspection mechanism and supplemental checked bag reconciliation area. The supplemental inspection mechanism, the first supplemental material handling device, and the supplemental inspection station are configured to be portable. The supplemental inspection mechanism, the first supplemental material handling device and the supplemental checked bag reconciliation area provide increased throughput of luggage items inspected during the occurrence of the peak event. The method further includes removing the supplemental inspection mechanism, the first supplemental material handling device and the supplemental checked bag reconciliation area after the occurrence of the peak event.

According to another aspect of the disclosure, a further method for operating a luggage inspection area is provided. The method includes providing an entrance mechanism which receives luggage items into the luggage inspection area. The method also includes providing at least one primary inspection station configured to inspect a predetermined throughput of luggage items received by the entrance mechanism. A primary material handling device is provided that is adapted to transport luggage items between the entrance mechanism and the at least one primary inspection station. The method proceeds with determining the occurrence of an upcoming peak event that correlates with the number of luggage items received into the luggage inspection area by the entrance mechanism being over the predetermined throughput of luggage items. The method follows with providing a supplemental inspection station and a first supplemental material handling device in response to the determination of the peak event to provide increased throughput of luggage items inspected in the luggage inspection area during the occurrence of the peak event. The supplemental inspection station and the first supplemental material handling device are each configured to be portable. The first supplemental material handling device is configured to transport the luggage items from the entrance mechanism to the supplemental inspection station.

According to a further aspect of the disclosure, a luggage inspection system is provided. The luggage inspection system includes an entrance mechanism that is configured to receive luggage items. A primary inspection station is configured to inspect a predetermined throughput of luggage items received by the entrance mechanism. A primary material handling device is configured to transport the luggage items between the entrance mechanism and the primary inspection station. A supplemental inspection station is provided that is configured to provide increased throughput of the luggage items inspected during the occurrence of a peak event. A first supplemental material handling device is configured to transport the luggage items between the entrance mechanism and the supplemental inspection station during the occurrence of the peak event. The supplemental inspection station and first supplemental material handling device are configured to be portable.

The invention in its broadest aspect therefore provides a luggage inspection area that may be expanded with supplemental components during the occurrence of a peak event to match increased throughput requirements during the peak event. Since the supplemental components are portable, the luggage inspection area may quickly and easily be expanded to accommodate the increased throughput requirement during the peak event and reduced back to its ordinary size after the peak event has ended. As such, equipment and facility expenses are reduced because the luggage inspection area doesn't have to be initially sized to handle the throughput demands of the peak event.

According to another aspect of the disclosure, due to the portable configuration of the supplemental components, they may be maintained as a kit such that they may be quickly and easily delivered to the inspection area and set up when needed. The kit may be owned by a party independent of the luggage inspection area, thus the owner of the luggage inspection area may save on the capital costs associated with by the supplemental components. Furthermore, the kit-owning party may provide the services of delivering the kit, installing the supplemental components, operating the luggage inspection area during the occurrence of the peak event, and removing the kit from the luggage inspection area after the peak event has ended. These services may be provided to various luggage inspection area owners at different times. According to another aspect of the disclosure, the kit may be utilized in a luggage inspection area to accommodate lost throughput capacity of the primary equipment due to unexpected events, e.g., malfunctioning equipment.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Referring to the Figures, wherein like numerals indicate corresponding parts throughout the several views, a system and method are provided for operating a luggage inspection area 20. It should be appreciated that the subject system and method may be utilized for various luggage inspection areas 20 including, but not limited to, those present in airports, train stations and other transportation hubs.

Figure 1:
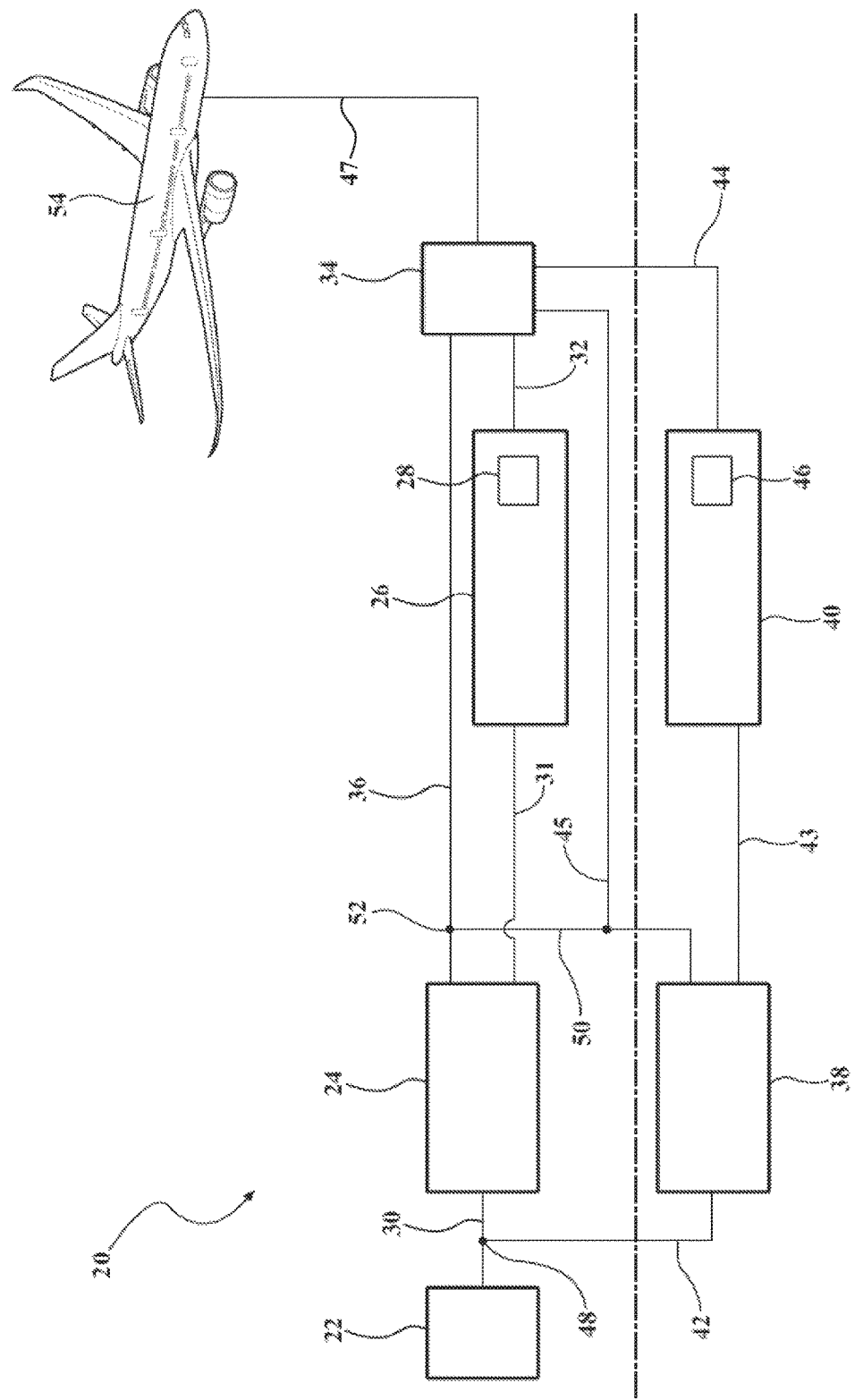
FIG. 1 is schematic of an example luggage inspection system according to an aspect of the disclosure.
Figure 2:
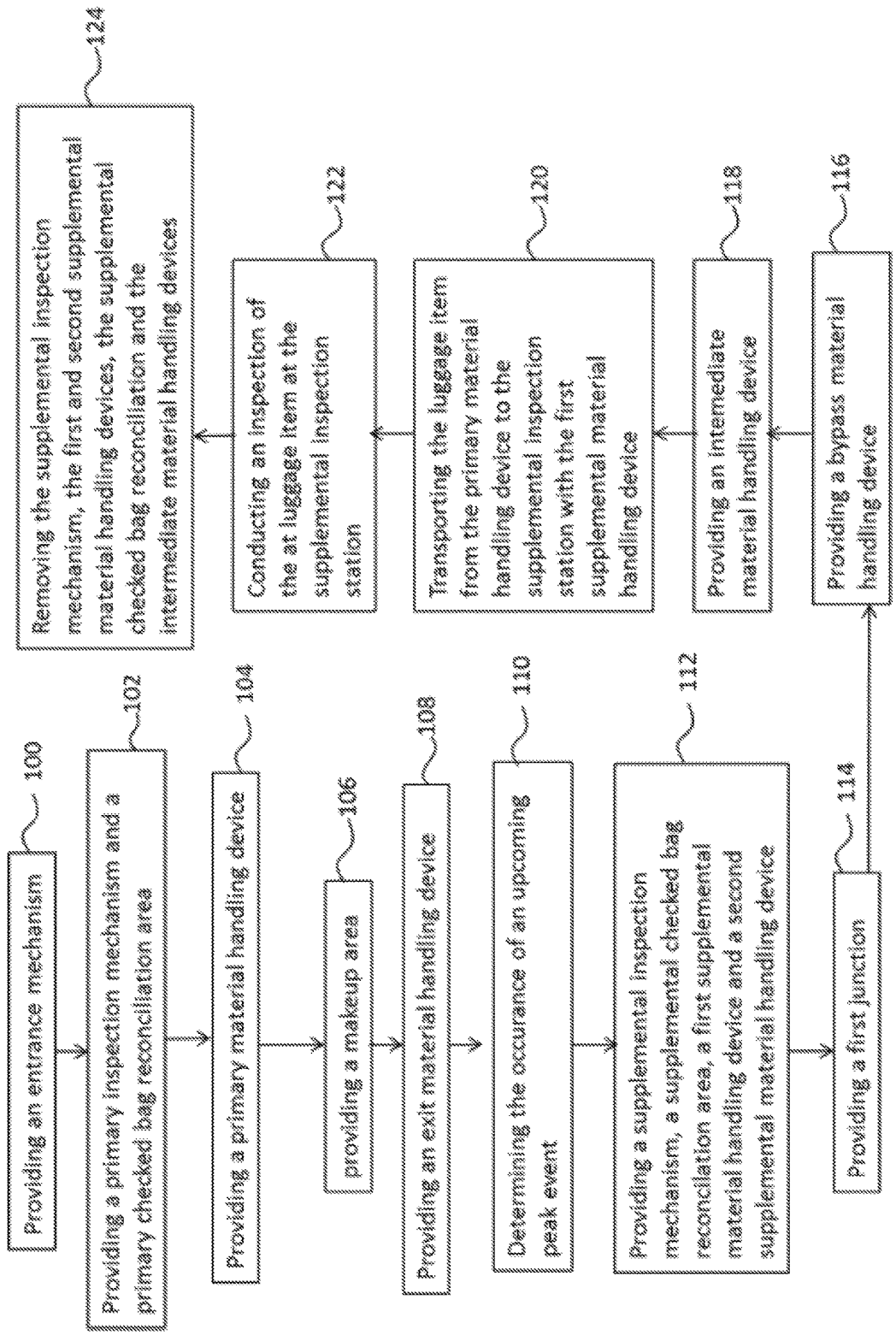
FIG. 2 is a flow diagram of an example method for operating a luggage inspection system according to an aspect of the disclosure.

As illustrated in FIG. 1, the luggage inspection area 20 includes an entrance mechanism 22 that receives luggage items into the luggage inspection area 20. For example, the entrance mechanism 22 may be a check-in-counter of an airport. The system further includes a primary inspection mechanism 24, such as an x-ray machine, for performing an initial inspection of the luggage item. It should be appreciated that other types of inspection mechanisms could be utilized.

The system further includes a primary checked bag reconciliation area 26 that is spaced from the primary inspection mechanism 24 and is utilized upon a determination that a given luggage item requires further inspection based on the inspection performed by the primary inspection mechanism 24. The primary checked bag reconciliation area 26 includes at least one primary inspection station 28 which may be staffed by one or more agents. Each primary inspection station 28 may include an inspection surface, tools for opening bags, an information display that is electronically connected to the facility securing screening network, and tools to facilitate the agents' inspection procedures.

The system further includes a primary material handling device 30, 31 that extends between the entrance mechanism 22, the primary inspection mechanism 24 and the primary checked bag reconciliation area 26 for transporting the luggage items between the entrance mechanism 22, the primary inspection mechanism 24 and the primary checked bag reconciliation area 26. The primary material handling device 30, 31 includes a first section 30 that extends between the entrance mechanism 22 and the primary inspection mechanism 24, as well as a second section 31 that extends between the primary inspection station 24 and the primary checked bag reconciliation area 26. It should be appreciated that the first and second sections 30, 31 of the primary material handling device 30, 31 may be separate components, or may be integrally connected to one another. It should also be appreciated that the term "material handling device" as used herein may refer to various types of material handling machines including, but not limited to, conveyors, manually driven carts, and automatic guided vehicles. In the embodiment in which a mobile device such as a manually driven cart or automatic guided vehicle is utilized, the term "extends between" may include a pre-established pathway on which the mobile device may follow.

An exit material handling device 32 is provided for interconnecting the primary checked bag reconciliation area 26 and a makeup area 34. At the makeup area 34, the luggage items may be removed from the exit material handling device 32 and transported to an ultimate destination, e.g., an airplane 54 or train. A final material handling device 47 may be provided between the makeup area 34 and the ultimate destination 54 for transporting the luggage items to the ultimate destination 54.

A bypass material handling device 36 extends directly between the primary inspection mechanism 24 and the makeup area 34 to transport the luggage items directly from the primary inspection mechanism 24 to the makeup area 34 upon a determination that the luggage items do not require further inspection from the primary checked bag reconciliation area 26.

It should be appreciated that the primary inspection mechanism 24 and first checked bag reconciliation area 26, together, define a nominal throughput capacity of luggage items that may be inspected per a unit of time in the inspection area 20. The nominal throughput capacity may be defined by the speed of the primary inspection mechanism 24 and the number of staffed primary inspection stations 28 in the first checked bag reconciliation area, and the mean processing time of the agents at the primary inspection stations 28. The nominal throughput capacity of the inspection area 20 is less than a peak throughput requirement that occurs during a peak event. The peak event may occur during only a few days in the year due to a sporting event, a convention, or some other rare event. In the event that it is determined that a peak event will occur, a supplemental inspection mechanism 38, a supplemental checked bag reconciliation area 40, a first supplemental material handling device 42, 43 and a second supplemental material handling device 44 are temporarily provided to temporarily expand the throughput capacity of the luggage inspection area 20 until the peak event ends.

More specifically, the supplemental inspection mechanism 38 is configured to receive luggage items in conjunction with the primary inspection mechanism 24, and to direct the luggage items to the supplemental checked bag reconciliation area 40 in response to a determination that the luggage items require further inspection. The supplemental checked bag reconciliation area 40 includes at least one supplemental inspection station 46. Like the primary inspection station 28, the supplemental inspection station 46 may include an inspection surface at which an inspecting agent may be positioned for providing a thorough examination of the luggage item.

The first supplemental material handling device 42, 43 extends between the primary material handling device 30, 31, the supplemental inspection mechanism 38 and the supplemental checked bag reconciliation area 40 for transporting the luggage items between the supplemental inspection mechanism 38 and supplemental checked bag reconciliation area 40. The first supplemental material handling device 42, 43 includes a first segment 42 that extends between the first section 30 of the primary material handling device 30, 31 (or entrance mechanism 22) and the supplemental inspection mechanism 38, as well as a second segment 43 that extends between the supplemental inspection mechanism 38 and the supplemental checked bag reconciliation area 40. It should be appreciated that the first and second segments 42, 43 of the first supplemental material handling device 42, 43 may be separate components, or may be integrally connected to one another. The second supplemental material handling device 44 is provided between the supplemental checked bag reconciliation area 40 and the makeup area 34 for transporting luggage items from the second checked bag reconciliation area 40 to the makeup area 34.

The supplemental inspection mechanism 38, the first and second supplemental material handling devices 42, 43, 44, and the components of the supplemental checked bag reconciliation area 40, including the supplemental inspection station 46, are configured to be portable. As such, these supplemental components may be quickly and easily delivered to, and set up at the luggage inspection area 20.

More specifically, to render the supplemental inspection mechanism 38 portable, it may be a compact X-ray machine that is positioned on wheels and sized such that it may easily be placed in, and removed from a transportation vehicle like a truck. Furthermore, to render the first and second supplemental material handling devices 42, 43, 44 portable, they may each be an automatic guided vehicle that may be easily transported. According to this embodiment, the automatic guided vehicle may include a search table upon which the at least one luggage item may be disposed, e.g., as disclosed in U.S. patent application Ser. No. 14/881,537, commonly owned by the Applicant and incorporated herein by reference. As such, conducting an inspection of the luggage items at the supplemental inspection station 46 may include conducting the inspection of the at least one luggage item while the luggage item is disposed on the search table of the automatic guided vehicle. Alternatively, to render the first and second supplemental material handling devices 42, 43, 44 portable, they may be conveyors comprised of lightweight materials such as aluminum, and sized such that they may easily be loaded and unloaded from a transportation device like a truck. To render the checked bag reconciliation area portable, the one or more secondary inspection stations 46 may be positioned on wheels and sized such that they may easily be placed in, and removed from a transportation device like a truck.

A first junction 48 is provided for interconnecting the primary material handling device 30, 31 and the first segment 43 of the supplemental material handling device 42, 43 to deliver luggage items from the primary material handling device 30, 31 to the supplemental inspection mechanism 38. More specifically, at the first junction 48, the luggage item may either continue to be transported by the primary material handling device 30, 31 to the primary inspection mechanism 24, or it may be transported by the first supplemental material handling device 42, 43 to the supplemental inspection mechanism 38.

Furthermore, an intermediary material handling device 50 is provided for interconnecting the supplemental inspection mechanism 38 and the bypass material handling device 36. Like the first and second supplemental material handling devices 42, 43 44, the intermediary material handling device 50 may be configured to be portable, e.g., as an automatic guided vehicle or light-weight, compact conveyor. A second junction 52 is provided for interconnecting the intermediary material handling device 50 and the bypass material handling device 36. The intermediary handling device 50 and second junction 52 allow luggage items to be transported from the supplemental inspection mechanism 38 to the bypass material handling device 36 and to the makeup area 34 upon a determination by the supplemental inspection mechanism 38 that the supplemental checked bag reconciliation area 40 should be bypassed. Alternatively, a secondary bypass material handling device 45 may be provided that extends directly to the makeup area 34 (instead of to the bypass material handling device 36).

Accordingly, the luggage inspection area 20 may be expanded during the occurrence of a peak event to match increased throughput requirements during the peak event. Since the aforementioned supplemental components are portable, the luggage inspection area 20 may quickly and easily be expanded to accommodate the increased throughput requirement during the peak event and reduced back to its ordinary size after the peak event has ended. As, such equipment and facility expenses are reduced because the luggage inspection area doesn't have to be initially sized to handle the throughput demands of the peak event.

Furthermore, due to the portable configuration of the supplemental components, they may be maintained as a kit such that they may be quickly and easily delivered to the inspection area and set up when needed. The kit may be owned by a party independent of the luggage inspection area, thus the owner of the luggage inspection area may save on the capital costs associated with purchasing the supplemental components. Furthermore, the kit-owning party may provide the services of delivering the kit, installing the supplemental components, operating the luggage inspection area 20 during the occurrence of the peak event, and removing the kit from the luggage inspection area 20 after the peak event has ended. These services may be provided to various luggage inspection area owners at different times. Additionally, the kit may be utilized in a luggage inspection area to accommodate lost throughput capacity of the primary equipment due to unexpected events, e.g., malfunctioning equipment.

Furthermore, it should be appreciated that the aforementioned supplemental components could be installed within the existing facility building housing the luggage inspection area 20 if space is available. If space is not available within the facility building, a temporary structure could be set up outside of the facility building, e.g., outside of an airport terminal. A door could be opened between the indoor facility and the space of the terminal, to connect the supplemental components.

A method for operating a luggage inspection area 20 is also provided. The method includes 100 providing an entrance mechanism 22. The method further includes 102 providing a primary inspection mechanism 24 and a primary checked bag reconciliation area 26. The primary checked bag reconciliation area 26 includes at least one primary inspection station 28. The method further includes 104 providing a primary material handling device 30, 31 that extends between the entrance mechanism 22, the primary inspection mechanism 24 and the primary checked bag reconciliation area 26 for transporting the luggage items between the entrance mechanism 22, the primary inspection mechanism 24 and the primary checked bag reconciliation area 26. The method continues with 106 providing a makeup area 34, from which the luggage items may be removed from the exit material handling device 32 and transported to an ultimate destination, e.g., an airplane 54 or train. The method continues with 108 providing an exit material handling device 32 that interconnects the primary checked bag reconciliation area 26 and the makeup area 54. The primary material inspection mechanism 24 is configured to inspect a predetermined throughput of luggage items, and to either direct the luggage items to the primary checked bag reconciliation area 26 in response to a determination that the luggage items require further inspection, or direct the luggage items to the makeup area 34 in response to a determination that the luggage items do not require further inspection.

The method proceeds by 110 determining the occurrence of an upcoming peak event that the number of luggage items received into the luggage inspection area 20 by the entrance mechanism 22 is over the predetermined nominal throughput of luggage items. In response to the determination of the peak event, the method continues with 112 providing a supplemental inspection mechanism 38, a supplemental checked bag reconciliation area 40, a first supplemental material handling device 42, 43 and a second supplemental material handling device 44, as described in the foregoing to provide increased throughput of luggage items inspected during the occurrence of the peak event.

The supplemental inspection mechanism 38 is configured to inspect a second throughput of luggage items and to direct the luggage items to the supplemental checked bag reconciliation area 40 in response to a determination that the luggage items require further inspection. The supplemental checked bag reconciliation area 40 includes at least one supplemental inspection station 46. The first supplemental material handling device 42, 43 extends between the supplemental inspection mechanism 38 and the supplemental checked bag reconciliation area 40 for transporting the luggage items between the supplemental inspection mechanism 38 and supplemental checked bag reconciliation area 40. The second supplemental material handling device 44 extends between the supplemental checked bag reconciliation area 40 and the makeup area 34. The supplemental inspection mechanism 38, the first and second supplemental material handling device 42, 43, 44, and the supplemental inspection station 46 are configured to be portable, as described in the foregoing.

The method further includes 114 providing a first junction 48 interconnecting the primary material handling device 30, 31 and the first supplemental material handling device 42, 43 to deliver luggage items from the primary material handling device 30, 31 to the supplemental inspection mechanism 38. The method also includes 116 providing a bypass material handling device 36 that extends between the primary inspection mechanism 24 and the makeup area 34 to transport the luggage items from the primary inspection mechanism 24 to the makeup area 34 upon a determination that the luggage items do not require further inspection and the primary checked bag reconciliation area 26 should be bypassed. The method further includes 118 providing an intermediate material handling device 50 that interconnects the supplemental inspection mechanism 38 and the bypass material handling device 36 to transport luggage items from the supplemental inspection mechanism 38 to the bypass material handling device 36, and thus to the makeup area 34 upon a determination that the supplemental checked bag reconciliation area 40 should be bypassed.

The method also includes 120 transporting the at least one of the luggage items from the primary material handling device 30, 31 to the supplemental inspection station 46 with the first supplemental material handling device 42, 43 during the occurrence of the peak event, and 122 conducting an inspection of the at least one luggage item at the supplemental inspection station 46 during the occurrence of the peak event. In the embodiment in which the first supplemental material handling device 42, 43 is an automatic guided vehicle, the step of 116 transporting the at least one of the luggage items from the primary material handling device 30, 31 to the supplemental inspection station 46 includes transporting the at least one luggage item to the supplemental inspection station 46 with the at least one luggage item disposed on a search table of the automatic guided vehicle, and the step of 118 conducting an inspection of the at least one luggage item at the supplemental inspection station 46 includes conducting the inspection of the at least one luggage item while the luggage item is disposed on the search table of the automatic guided vehicle.

The method continues with 124 removing the supplemental inspection mechanism 38, the first and second supplemental material handling devices 42, 43, 44 and the supplemental checked bag reconciliation area 40 after the occurrence of the peak event.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:

1. A method for operating a luggage inspection area, said method including:
providing an entrance mechanism wherein the luggage items are received into the luggage inspection area;
providing a primary inspection mechanism being configured to direct the luggage items to a primary checked bag reconciliation area in response to a determination that the luggage items require further inspection, wherein the primary checked bag reconciliation area includes at least one primary inspection station, and wherein the primary inspection mechanism and the primary checked bag reconciliation area are configured to inspect a predetermined throughput of luggage items;
providing a primary material handling device extending between the entrance mechanism, the primary inspection mechanism and the primary checked bag reconciliation area for transporting the luggage items between the entrance mechanism, the primary inspection mechanism and the primary checked bag reconciliation area;
determining the occurrence of an upcoming peak event that the number of luggage items received into the luggage inspection area by the entrance mechanism is over the predetermined throughput of luggage items;
providing a supplemental inspection mechanism, a supplemental checked bag reconciliation area and a first supplemental material handling device in response to the determination of the peak event;
wherein the supplemental inspection mechanism is configured to direct the luggage items to the supplemental checked bag reconciliation area in response to a determination that the luggage items require further inspection, wherein the supplemental checked bag reconciliation area includes at least one supplemental inspection station, and wherein the first supplemental material handling device extends between the supplemental inspection mechanism and the supplemental checked bag reconciliation area for transporting the luggage items between the supplemental inspection mechanism and supplemental checked bag reconciliation area;
wherein the supplemental inspection mechanism, the first supplemental material handling device, and the supplemental inspection station are configured to be portable, and wherein the supplemental inspection mechanism, the first supplemental material handling device and the supplemental checked bag reconciliation area provide increased throughput of luggage items inspected during the occurrence of the peak event; and
removing the supplemental inspection mechanism, the first supplemental material handling device and the supplemental checked bag reconciliation area after the occurrence of the peak event;
wherein the first supplemental material handling device is an automatic guided vehicle.

2. The method of claim 1 wherein the entrance mechanism is a check-in-counter of an airport.

3. The method of claim 1 further including:
providing a first junction interconnecting the primary material handling device and the first supplemental material handling device to deliver luggage items from the primary material handling device to the supplemental inspection mechanism.

4. The method as set forth in claim 1 further including:
providing an exit material handling device interconnecting the primary checked bag reconciliation area and a makeup area at which the luggage items are removed from the exit material handling device and transported to an airplane.

5. The method of claim 4 further including:
providing a second supplemental material handling device extending between the supplemental checked bag reconciliation area and the makeup area.

6. The method of claim 5 further including:
providing a bypass material handling device extending directly between the primary inspection mechanism and the makeup area to transport the luggage items directly from the primary inspection mechanism to the makeup area upon a determination that the luggage items do not require further inspection and the primary checked bag reconciliation area should be bypassed.

7. The method of claim 6 further including:
providing a second junction interconnecting the supplemental inspection mechanism and the bypass material handling device to transport luggage items from the supplemental inspection station to the bypass material handling device and to the makeup area upon a determination that the supplemental checked bag reconciliation area should be bypassed.

8. The method of claim 1 further including transporting the at least one of the luggage items from the primary material handling device to the supplemental inspection station with the first supplemental material handling device during the occurrence of the peak event, and conducting an inspection of the at least one luggage item at the supplemental inspection station during the occurrence of the peak event.

9. The method of claim 8 wherein the first supplemental material handling device is an automatic guided vehicle, wherein transporting at least one of the luggage items from the primary material handling device to the supplemental inspection station includes transporting the at least one luggage item to the supplemental inspection station with the at least one luggage item disposed on a search table of the automatic guided vehicle, and wherein conducting an inspection of the at least one luggage item at the supplemental inspection station includes conducting the inspection of the at least one luggage item while the luggage item is disposed on the search table of the automatic guided vehicle.

10. A method for operating a luggage inspection area, said method including:
providing an entrance mechanism wherein the luggage items are received into the luggage inspection area;
providing at least one primary inspection station configured to inspect a predetermined throughput of luggage items received by the entrance mechanism;
providing a primary material handling device adapted to transport luggage items between the entrance mechanism and the at least one primary inspection station;
determining the occurrence of an upcoming peak event that correlates with the number of luggage items received into the luggage inspection area by the entrance mechanism being over the predetermined throughput of luggage items;
providing a supplemental inspection station and a first supplemental material handling device in response to the determination of the peak event to provide increased throughput of luggage items inspected in the luggage inspection area during the occurrence of the peak event, wherein the supplemental inspection station and the first supplemental material handling device are each configured to be portable; and wherein the first supplemental material handling device is configured to transport the luggage items from the entrance mechanism to the supplemental inspection station;

wherein the first supplemental material handling device is an automatic guided vehicle.

11. A method as set forth in claim 10 further including removing the first supplemental material handling device and the supplemental inspection station from the luggage inspection area after the occurrence of the peak event.

12. A method as set forth in claim 10 further including transporting at least one of the luggage items from the entrance mechanism to the supplemental inspection station with the first supplemental material handling device during the occurrence of the peak event.

13. A method as set forth in claim 12 further including conducting an inspection of the at least one luggage item at the supplemental inspection station during the occurrence of the peak event.

14. A method as set forth in claim 13 wherein the first supplemental material handling device is an automatic guided vehicle, wherein transporting at least one of the luggage items from the entrance mechanism to the supplemental inspection station includes transporting the at least one luggage item to the supplemental inspection station with the luggage item disposed on a search table of the automatic guided vehicle, and wherein conducting an inspection of the at least one luggage item includes conducting the inspection of the luggage item while the luggage item is disposed on the search table of the automatic guided vehicle.

15. A luggage inspection system including:
an entrance mechanism configured to receive luggage items;
a primary inspection station space configured to inspect a predetermined throughput of luggage items received by said entrance mechanism;
a primary material handling device configured to transport the luggage items between said entrance mechanism and said primary inspection station;
a supplemental inspection station that is configured to provide increased throughput of the luggage items inspected during the occurrence of a peak event, and wherein the supplemental inspection station is configured to be portable; and
a first supplemental material handling device configured to transport the luggage items between said entrance mechanism and said supplemental inspection station during the occurrence of the peak event, wherein said first supplemental material handling device is configured to be portable;
wherein said first supplemental material handling device is an automatic guided vehicle.

16. A system as set forth in claim 15 wherein said entrance mechanism is a check-in counter of the airport.

17. A system as set forth in claim 15 further including a primary checked bag reconciliation area and a supplemental checked bag reconciliation area;
said primary material handling device further interconnecting said primary inspection mechanism and said primary checked bag reconciliation area for transporting luggage items from said primary inspection mechanism to said primary checked bag reconciliation area; and
said supplemental material handling device further interconnecting said supplemental inspection mechanism and said supplemental checked bag reconciliation area for transporting luggage items from said supplemental inspection mechanism to said supplemental checked bag reconciliation area.

* * * * *